US009011011B2

(12) United States Patent
Fiedler

(10) Patent No.: US 9,011,011 B2
(45) Date of Patent: Apr. 21, 2015

(54) BEARING HOUSING COVER FOR A CHARGING DEVICE

(75) Inventor: Max Fiedler, Kornwestheim (DE)

(73) Assignee: Bosch Mahle Turbo Systems GmbH & Co. KG (DE)

(*) Notice: Subject to any disclaimer, the term of this patent is extended or adjusted under 35 U.S.C. 154(b) by 983 days.

(21) Appl. No.: 13/041,898

(22) Filed: Mar. 7, 2011

(65) Prior Publication Data

US 2011/0215753 A1 Sep. 8, 2011

(30) Foreign Application Priority Data

Mar. 8, 2010 (DE) ......................... 10 2010 010 573
Jun. 29, 2010 (DE) ......................... 10 2010 025 575

(51) Int. Cl.
*F16C 35/02* (2006.01)
*F01D 25/14* (2006.01)
*F01D 25/16* (2006.01)

(52) U.S. Cl.
CPC .............. *F01D 25/14* (2013.01); *F01D 25/162* (2013.01); *F05D 2230/26* (2013.01); *F05D 2230/50* (2013.01); *F05D 2260/20* (2013.01); *F05D 2230/25* (2013.01); *F05D 2230/24* (2013.01); *F05D 2220/40* (2013.01)

(58) Field of Classification Search
CPC ..... F01D 25/14; F01D 25/162; F01D 25/164; F16C 35/02
USPC ........... 415/177, 178, 180; 417/407; 384/428, 384/438, 440–444, 295, 296
See application file for complete search history.

(56) References Cited

U.S. PATENT DOCUMENTS

| | | | | |
|---|---|---|---|---|
| 2,646,210 | A | 7/1953 | Kohlmann | |
| 3,106,381 | A | 10/1963 | Leins | |
| 3,477,867 | A | 11/1969 | Hillier | |
| 4,265,456 | A | 5/1981 | Atkin | |
| 4,725,206 | A | 2/1988 | Glaser et al. | |
| 4,761,364 | A | 8/1988 | Schmauder | |
| 4,786,238 | A | 11/1988 | Glaser et al. | |
| 5,605,045 | A * | 2/1997 | Halimi et al. | 60/607 |
| 7,442,422 | B2 | 10/2008 | Salameh et al. | |
| 2010/0202875 | A1 * | 8/2010 | Schlienger et al. | 415/173.1 |

FOREIGN PATENT DOCUMENTS

| | | | |
|---|---|---|---|
| DE | 897902 | C | 11/1953 |
| DE | 1116941 | B | 11/1961 |
| DE | 1217153 | B | 5/1966 |
| DE | 1221489 | B | 7/1966 |
| DE | 3616697 | A1 | 11/1987 |
| DE | 4330380 | A1 | 3/1995 |
| DE | 10036756 | A1 | 2/2002 |
| DE | 10321584 | A1 | 12/2004 |
| DE | 102004023284 | A1 | 12/2005 |
| DE | 102004031986 | A1 | 1/2006 |
| DE | 102008011257 | A1 | 9/2009 |
| DE | 102008000855 | A1 | 10/2009 |
| EP | 1672181 | A1 | 6/2006 |
| EP | 2078825 | A2 | 7/2009 |
| EP | 2365190 | A2 | 9/2011 |
| FR | 2900975 | A1 | 11/2007 |
| GB | 1109518 | A | 4/1968 |
| GB | 1440564 | A | 6/1976 |
| JP | 11082037 | | 3/1999 |
| WO | WO-2009106159 | A1 | 9/2009 |
| WO | WO-2010002717 | A2 | 1/2010 |

OTHER PUBLICATIONS

German Search report for DE102010025575.0.
German Search Report for DE102010010573.2.
English abstract for EP1672181.
English abstract for DE102008011257.
English abstrac tfor DE4330380.
English abstract for EP-2365190.
English abstract for FR-2900975.
English abstract for DE-102008000855.
English abstract for DE-102004031986.
English abstract for DE-102004023284.
International Search Report for PCT/EP2011/051591 dated Sep. 7, 2011.
EP Search Report for EP-11153225.5, dated Oct. 16, 2013.
English abstract for JP11082037.
English abstract for DE-10036756.
Office Action for EP11733605.7-1610, dated Nov. 10, 2014.

* cited by examiner

*Primary Examiner* — Phillip A Johnson
(74) *Attorney, Agent, or Firm* — Rader, Fishman & Grauer PLLC

(57) ABSTRACT

A bearing housing cover for a bearing housing of a charging device is presented. The housing cover is formed of metal by a mechanisms of at least one of internal high-pressure forming (IHU), deep-drawing, forging and roller burnishing.

12 Claims, 2 Drawing Sheets

BEARING HOUSING COVER FOR A CHARGING DEVICE

CROSS-REFERENCES TO RELATED APPLICATION

This application claims priority to German patent applications DE 10 2010 010 573.2 filed on Mar. 8, 2010 and DE 10 2010 025 575.0 filed on Jun. 29, 2010, which are hereby incorporated by reference in their entirety.

TECHNICAL FIELD

The present invention relates to a bearing housing cover for a bearing housing of a charging device, more preferably for an exhaust gas turbocharger of a motor vehicle. In addition, a bearing housing with such a bearing housing cover as well as well as a charging device having such a bearing housing cover or such a bearing housing is likewise subject of the invention. In addition, the invention relates to a method for producing a bearing housing cover more preferably arranged on the compressor side for closing a bearing housing of a charging device.

BACKGROUND

From WO 2010/002717 A2 a generic bearing housing for an exhaust gas turbocharger is known. On the compressor side, the bearing housing comprises an opening which can be closed with a bearing housing cover. Thus, through the bearing housing cover, the compressor housing interior can be separated from the bearing housing interior or sealed in a gas-tight manner. The bearing housing cover can be fixed to the bearing housing with a bayonet closure. The bearing housing cover is additionally designed in such a manner that in installation position it serves as mounting for the shaft sealing rings or piston rings.

Usually, a bearing housing cover is currently embodied with a circumferential annular groove for a sealing element, such as an O-ring. Producing the bearing housing cover thus requires several processing steps and among other things can therefore be accomplished only in a constructively involved and expensive manner.

SUMMARY

The present invention now deals with the problem of stating an improved or at least an alternative embodiment for a bearing housing cover and a bearing housing, which is more preferably characterized by an inexpensive and simplified manufacturing method.

According to the invention, this problem is solved through the subjects of the independent claims. Advantageous embodiments are the subject of the dependent claims.

The invention is based on the general idea of designing the bearing housing cover as a formed sheet metal part by means of a forming method. If the bearing housing cover is produced as formed sheet metal part through a forming method, a following processing is clearly less involved or can be entirely avoided in the most favourable of cases. Because of this, the manufacture of such a bearing housing cover is more favourable and less involved so that both process as well as material costs can be saved.

In addition, a method for manufacturing a bearing housing cover more preferably arranged on the compressor side for closing a bearing housing of a charging device is likewise the subject of the invention, wherein at least a part region of the bearing housing cover is produced of at least one metal sheet by means of a forming method. Preferably, not only the component geometry is formed through the forming method, but also for example grooves, bores, fits or the like. Because of the simultaneous forming of a wide range of function elements of the bearing housing cover a required reworking of the bearing housing cover can be additionally further reduced.

Preferably the bearing housing cover is unitarily produced of a metal sheet by means of the forming method. However, it is also conceivable that the bearing housing cover consists of at least two part regions which are joined to each other through a joining method. The part regions in turn can be produced of a metal sheet through a forming method. As forming method, internal high-pressure forming (IHU), deep-drawing, forging, particularly preferred drop forging and/or roller burnishing are applied. Collar pulling, inside-out redrawing and/or the bending can also be employed as forming method. Alternatively or additionally, manufacturing methods and particularly preferred cutting methods, such as the drilling can be used. Preferably, a cutting method such as stamping, cutting and/or shear-cutting are alternatively or additionally applied. It is likewise advantageous to employ a solid forming method such as rolling, extruding, drawing and/or upsetting. Particularly preferred is the use of several of these methods named above and of other popular processing methods for metal sheets. If two part regions of the bearing housing cover are now joined together, welding, preferably electron beam welding and/or laser welding, brazing, caulking, flanging, collaring-over, riveting and/or gluing can be employed as joining method.

Further important features and advantages of the invention are obtained from the subclaims, from the drawings and from the corresponding figure description by means of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters refer to same or similar or functionally same components.

BRIEF DESCRIPTION OF THE DRAWING

It shows, in each case schematically.

DETAILED DESCRIPTION

Figure 1:
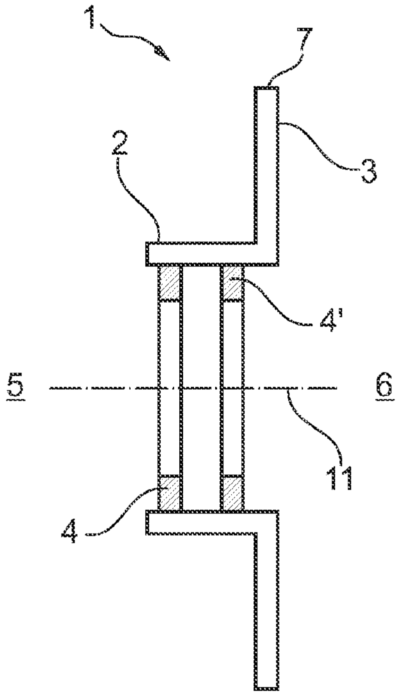
FIG. 1 a bearing housing cover with a cylindrical fixing region and a disc-like covering region, FIG. 2 a bearing housing cover with an additional cylindrical joining region, FIG. 3 the bearing housing cover with fixing region and joining region equilaterally orientated with respect to the covering region, FIG. 4 the bearing housing cover with an annular groove formed in the covering region, FIG. 5 the bearing housing cover with a radial groove formed in the joining region.

According to FIG. 1, a bearing housing cover 1 comprises at least one cylindrical fixing region 2 and a disc-like covering region 3. With the cylindrical fixing region 2 at least one piston ring 4, 4' or a shaft sealing ring or a bearing ring can be fixed in radial direction.

A charging device not shown in the figures as a rule has a turbine housing on the turbine side in whose interior a turbine wheel is arranged and a compressor housing on the compressor side, in whose interior a compressor wheel is positioned. Between the turbine and the compressor housing a bearing housing is arranged which serves as rotation-moveable mounting for the shaft of the rotor, which comprises the turbine wheel, the compressor wheel and the shaft. In order to protect a bearing housing interior from the gases flowing in the turbine housing or in the compressor housing, the bearing housing is closed with a bearing housing cover on the turbine side and/or compressor side. Here, the bearing housing cover is arranged on the compressor side.

As shown in FIG. 1 the bearing housing cover 1 is orientated with its fixing region 2 towards the turbine side or compressor side 6 while the covering region 3 is orientated towards the bearing housing side 5.

By means of fastening elements not shown in FIG. 1 the covering region 3 can be fastened to the bearing housing which is likewise not shown. Screws, rivets, press-in studs or the like can be used as fastening elements. It is likewise conceivable that the covering region 3 is glued, welded or joined by brazing, caulking, flanging or collaring-over to the bearing housing. In addition, the covering region 3 can also comprise webs, by means of which the covering region 3, 7 can be joined to the bearing housing in the manner of a bayonet closure. Fastening of the bearing housing cover 1 to the bearing housing by pressing a marginal region 7 of the covering region 3 into a groove on the bearing housing side is likewise conceivable.

Figure 2:
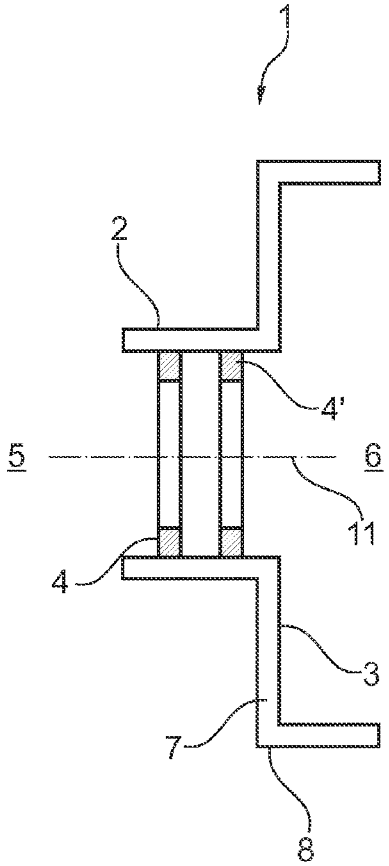

In addition, as shown in FIG. 2, the bearing housing cover 1 can have a cylindrical joining region 8. By means of the joining region 8 the bearing housing cover 1 can be joined to the bearing housing. Here, the joining region 8 and the fixing region 2 can be arranged on different sides with respect to the covering region 3, as shown in FIG. 2, so that the fixing region 2 is orientated towards the turbine side or compressor side 6 while the joining region 8 is orientated towards the bearing housing side 5.

Figure 3:
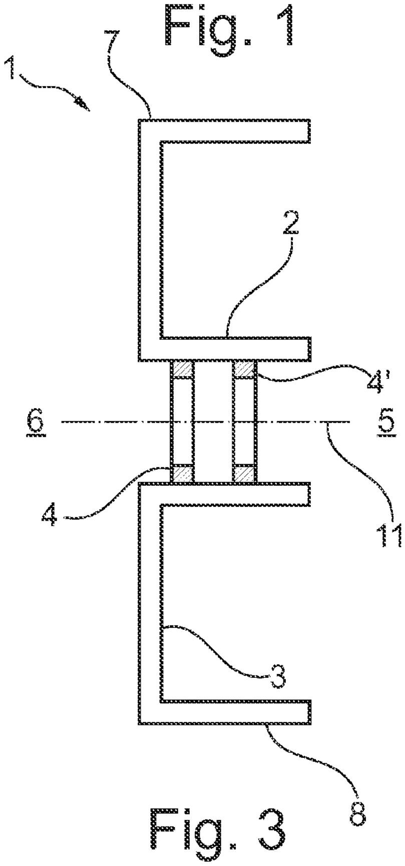

According to FIG. 3, another arrangement of the fixing region 2 and the joining region 3 is also possible however. In this embodiment, the fixing region 2 and the joining region 8 are orientated towards the bearing housing side 6. Thus the bearing housing cover 1 can have a cylindrical fixing region 2 and/or a perforated disc-like covering region 3 and/or a cylindrical joining region 8.

Preferably, the bearing housing cover 1 is formed of a metal sheet. As material for such a metal sheet, all formable steel types can be utilised, also including bake-hardening sheets. Preferably aluminium or an aluminium alloy is used as material. The use of precision-casting sheets is also preferred. However, other metal materials suitable for a forming process can also be used. Bake-hardening sheets means sheets of a metal material that is subjected to a hardness increase through heating to temperatures around approximately 200° C. Here, the bake-hardening sheet is formed prior to heating and hardened through baking after the forming method.

Particularly preferably metal sheets are used which are formed in the manner of a tailored-blank design. A metal sheet in tailored-blank design means a metal sheet that is composed of different material qualities and/or sheet thicknesses. This prefabricated semi-finished product is subsequently formed into the desired bearing housing cover 1 for example through deep-drawing or through other forming methods. If the bearing housing cover 1 is designed in the manner of a tailored-blank design, the bearing housing cover 1 can be designed in the corresponding regions in accordance with the respective loads in these regions. Thus it is conceivable that the bearing housing cover 1 also performs the function of a heat shield for the bearing housing. In this case, precisely those portions that are exposed to a high temperature can be formed of suitably temperature-resistant material by means of the tailored-blank design.

Preferably, the bearing housing cover 1 is a unitary design of a metal sheet. However, a multiple part design of the bearing housing cover 1 is also possible, wherein the individual part regions are joined to one another through a joining method following the forming of the individual part regions. A part region can for example be the fixing region 2 and/or the covering region 3 and/or the joining region 8.

Figure 4:
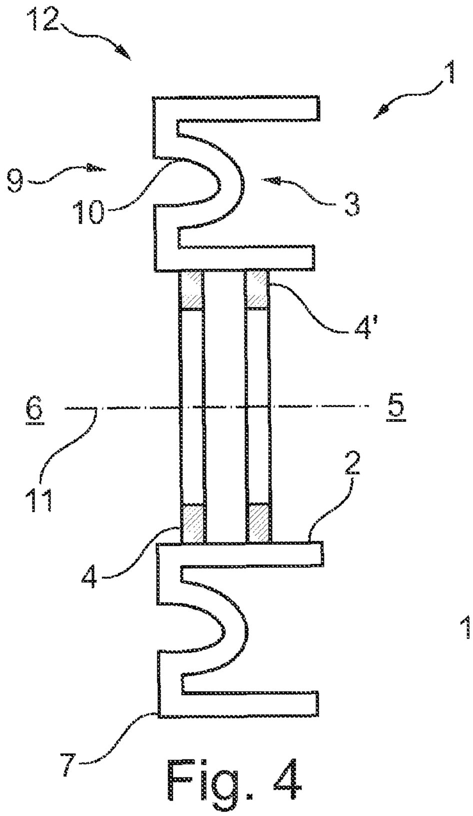

The embodiment of a bearing housing cover 1 shown in FIG. 4 has a profiling 9 in the covering region 3, which in the covering region 3 is formed as annular groove 10. With respect to an axis of rotation 11 of the shaft not shown in FIG. 4 the annular groove 10 runs at a constant radial distance to the axis of rotation 11 in the covering region 3. Such a profiling 9 is used as a radially active clamping element for clamping the bearing housing cover 1 in the bearing housing. Thus, a bearing housing cover 1, as for instance shown in FIG. 4, can be pressed into the bearing housing and because of the clamping element or the profiling 9 subjected to clamping can be joined to the bearing housing in the manner of a press seat. In this case, fastening by means of fastening elements can advantageously be omitted for example in the covering region 3.

Such a profiling 9 can also be designed wave-shaped, while the wave shape has a radial course.

Thus the profiling 9 together with the joining region 8 forms a joining device 12 by means of which the bearing housing cover 1 can be fastened to the bearing housing.

Figure 5:
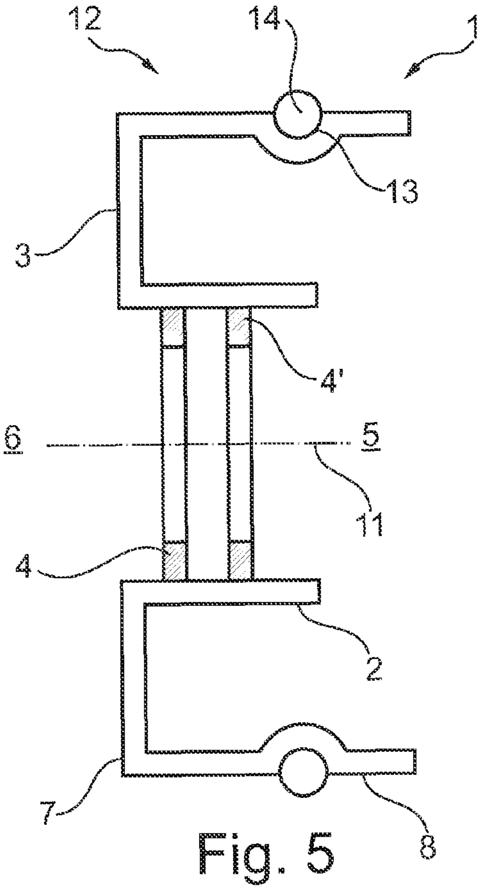

In FIG. 5 a further embodiment of the joining device 12 is shown. In this case, a radial groove 13 is formed in the joining region 8 of the bearing housing cover 1. In this radial groove 13 a sealing element 14 can be inserted so that the bearing housing cover 1 by means of the sealing element 14 can be joined to the bearing housing. In the case that a sealing element 14 is used, the bearing housing cover 1 can additionally be joined to the bearing house in a tight manner. The sealing element 14 can be designed as sealing ring, o-ring or the like. In this case the joining device 12 is formed through the radial groove 13 and the sealing element 14, both of which are arranged in the joining region 8.

In a further embodiment a tongue formed on the bearing housing can engage in the radial groove 13 of the bearing housing cover 1 provided the latter is in installation position. In this case no sealing element 14 if applicable is arranged in the radial groove 13 and/or the joining device 12 designed in the manner of a groove/tongue joining device, wherein the joining device 12 in this case comprises a radial groove arranged in the joining region 8 and a tongue on the bearing housing side.

In contrast with the annular groove 10, which has an opening orientated towards the axis of rotation 11 in longitudinal direction, the radial groove 13 is equipped with an opening orientated in radial direction. The joining device 12 can likewise be designed as screw joining device or bayonet joining device. In the case of being designed as screw joining device, an outer thread can be arranged in the joining region 8 by means of which the joining region 8 can be screwed into an inner thread formed on the bearing housing. In the case of being designed as bayonet joining device, webs or bulges interrupted in circumferential direction are formed on the bearing housing cover 1 in the joining region 8, so that the joining region 8 with its webs or bulges can be joined to the bearing housing in the manner of a bayonet closure. The formation of a radial groove 13 which is interrupted through longitudinal grooves arranged in the joining region 8 is likewise conceivable. In this case the webs or bulges of the bearing housing region can be inserted in the longitudinal grooves and inserted in the radial groove 13 through twisting. Thus in this case the bearing housing cover 1 can likewise be fixed to the bearing housing in the manner of a bayonet closure.

The invention claimed is:

1. A bearing housing cover for a bearing housing of a charging device comprising:

at least one elongated cylindrical fixing region for the radial fixing of at least one piston ring;

a disc-shaped covering region; and an elongated cylindrical joining region;

wherein the joining region includes at least one radial groove configured to receive a sealing element.

2. The bearing housing cover according to claim 1, wherein the bearing housing cover comprises at least two part regions, each produced of metal sheets and joined to each other.

3. The bearing housing cover according to claim 1, wherein the bearing housing cover is simultaneously designed as a heat shield.

4. The bearing housing cover according to claim 1, wherein the bearing housing cover is formed of at least one of aluminium, precision casting and sheet steel.

5. The bearing housing cover according to claim 1, wherein said elongated cylindrical joining region is greater than or equal in length to said elongated cylindrical fixing region.

6. The bearing housing cover according to claim 5, wherein said radial groove is positioned to substantially radially align with the radial fixing of at least one piston ring.

7. A bearing housing cover for a bearing housing of a charging device comprising:

at least one elongated cylindrical fixing region for the radial fixing of at least one piston ring;

a disc-shaped covering region; and an elongated cylindrical joining region;

wherein the covering region includes a profiling which is a radially active clamping element; and wherein the bearing housing cover is formed of metal by a mechanism of at least one of internal high-pressure forming (IHU), deep-drawing, forging and roller burnishing.

8. The bearing housing cover according to claim 7, wherein the bearing housing cover is simultaneously designed as a heat shield and is formed of at least one of aluminium, precision casting and sheet steel.

9. A cover for a bearing housing of a charging device comprising:

the bearing housing cover comprising:

at least one elongated cylindrical fixing region for the radial fixing of at least one piston ring;

a disc-shaped covering region; and an elongated cylindrical joining region;

wherein the joining region includes at least one radial groove configured to receive a sealing element wherein the bearing housing cover is unitarily produced of a metal sheet formed by a mechanism of at least one of internal high-pressure forming (IHU), deep-drawing, forging and roller burnishing.

10. The cover according to claim 9, wherein the covering region includes a profiling which is a radially active clamping element.

11. The bearing housing cover according to claim 9, wherein the bearing housing cover comprises at least two part regions, each produced of metal sheets and joined to each other.

12. The bearing housing cover according to claim 9, wherein said radial groove is positioned to substantially radially align with the radial fixing of at least one piston ring.

* * * * *